US005712887A

United States Patent [19]
Thompson et al.

[11] Patent Number: 5,712,887
[45] Date of Patent: Jan. 27, 1998

[54] METHODS AND APPARATUS FOR APPLYING A COMPRESSIVE FORCE TO A CORE SHROUD

[75] Inventors: Jeffrey L. Thompson; Thomas Armine Lewis; Frank Ortega, all of San Jose, Calif.

[73] Assignee: General Electric Company, Schnenectady, N.Y.

[21] Appl. No.: 769,470

[22] Filed: Dec. 20, 1996

[51] Int. Cl.$^6$ .................................................. G21C 19/02
[52] U.S. Cl. ...................... 376/260; 376/302; 29/890.031
[58] Field of Search .................................. 376/260, 287, 376/302; 29/402.01, 890.031

[56] References Cited

U.S. PATENT DOCUMENTS

5,402,570  4/1995  Weems .................... 29/890.031

Primary Examiner—Michael J. Carone
Assistant Examiner—Matthew J. Lattig
Attorney, Agent, or Firm—Armstrong, Teasdale, Schlafly & Davis

[57] ABSTRACT

Methods and apparatus for maintaining a compression force in a reactor pressure vessel (RPV) of a nuclear reactor are described. In one embodiment of the apparatus, a spring assembly facilitates applying compression force on the shroud head. The spring assembly, in one embodiment, includes two trusses and two torsion bars. The torsion bars extend between the trusses and are connected at opposite ends to the trusses. Each truss includes a truss support member, a hooking element, and a torsion converter element. The truss support member is configured to rest on the shroud head flange. The hooking element is pivotally coupled to the truss support member, and includes a hook adjacent a guide rod. The torsion converter element is coupled to the hooking element, and is vertically movable with respect to the truss support member. The converter element has two ends, each end splined to one of the torsion bars so that vertical movement of the converter element drives, e.g., rotates, the torsion bars.

19 Claims, 6 Drawing Sheets

FIG_8

FIG. 9

FIG_10

FIG_11

METHODS AND APPARATUS FOR APPLYING A COMPRESSIVE FORCE TO A CORE SHROUD

FIELD OF THE INVENTION

This invention relates generally to nuclear reactors and, more particularly, to methods and apparatus for maintaining a compression force on a shroud within a nuclear reactor pressure vessel.

BACKGROUND OF THE INVENTION

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core plate and is supported by a shroud support structure. Particularly, the shroud has a generally cylindrical shape and surrounds the both the core plate and the top guide. The top guide includes several openings, and fuel bundles are inserted through the openings and are supported by the core plate.

The shroud includes a shroud head having a shroud head flange. Guide rods and alignment pins extend through the shroud head to align and secure the shroud within the RPV. Shroud head bolts are used to further secure and align the shroud within the RPV.

During RPV operation, heat generated within the core causes the shroud to expand. Since the shroud and RPV are fabricated from different types of steel, the shroud expands at a rate different from the expansion rate of the RPV. In addition, and with respect to the shroud, it is possible that cracks may develop in the shroud.

In the past, and to minimize propagation of cracking in the shroud, a compression load is placed on the shroud using tie rods. For example, a tie rod may be secured to the shroud at its ends and extend across a crack. The tie rod is then tightened so that the shroud portions on opposing sides of the crack are forced together.

Although the tie rod configuration described above provides acceptable results, it would be desirable to provide an apparatus which substantially maintains shroud compression without requiring tie rods. It also would be desirable to provide such an apparatus which is easy to install.

SUMMARY OF THE INVENTION

These and other objects are attained by an apparatus which, in one embodiment, includes a spring assembly for applying compression forces on the shroud. More particularly, and in accordance with one embodiment of the present invention, the spring assembly is configured to rest on the shroud head flange, and to translate differential expansion rates of the RPV and the shroud into a compression force which the spring assembly exerts on the shroud.

The spring assembly includes first and second torsion bars, and first and second torsion bar support members. Each torsion bar is rotatably connected at one end to the first torsion bar support member, and is rotatably connected at the opposite end to the second torsion bar support member. In one form, each torsion bar support member includes a truss having a truss support member, a hooking element, and a torsion converter element. Each truss support member includes two legs which are configured to rest on the shroud head flange so that each truss extends substantially vertically from the shroud head flange. The hooking elements include hooks and are pivotally mounted to respective truss support members so that each hooking element may move relative to the respective truss support member.

The torsion converter elements are coupled to respective hooking elements, and each torsion converter element includes a first end and a second end. The first end of each torsion converter element is attached to a respective opposite end of the first torsion bar, and the second end of each torsion converter element is attached to a respective opposite end of the second torsion bar. Particularly, each torsion converter element is coupled to the respective hooking element so that hooking element rotation drives the torsion converter element in a substantially vertical direction to rotate the torsion bars. The torsion converter elements each are further configured to apply equal and opposite torques to each respective torsion bar, i.e., each end of each torsion bar is rotated in an opposite direction, thereby storing strain energy.

Each truss is positioned adjacent a guide rod so that each hook member is in communication with a guide rod. During thermal expansion of the shroud relative to the guide rod, each hooking element rotates and thus drives each respective torsion converter element. Accordingly, each torsion bar is rotated, and a compressive force is thereby exerted on the shroud.

By using the above described spring assembly, shroud compression is substantially maintained even when the shroud expands at a rate different from the RPV. In addition, such spring assembly is easy to install on the shroud.

DETAILED DESCRIPTION OF THE DRAWINGS

Figure 1:
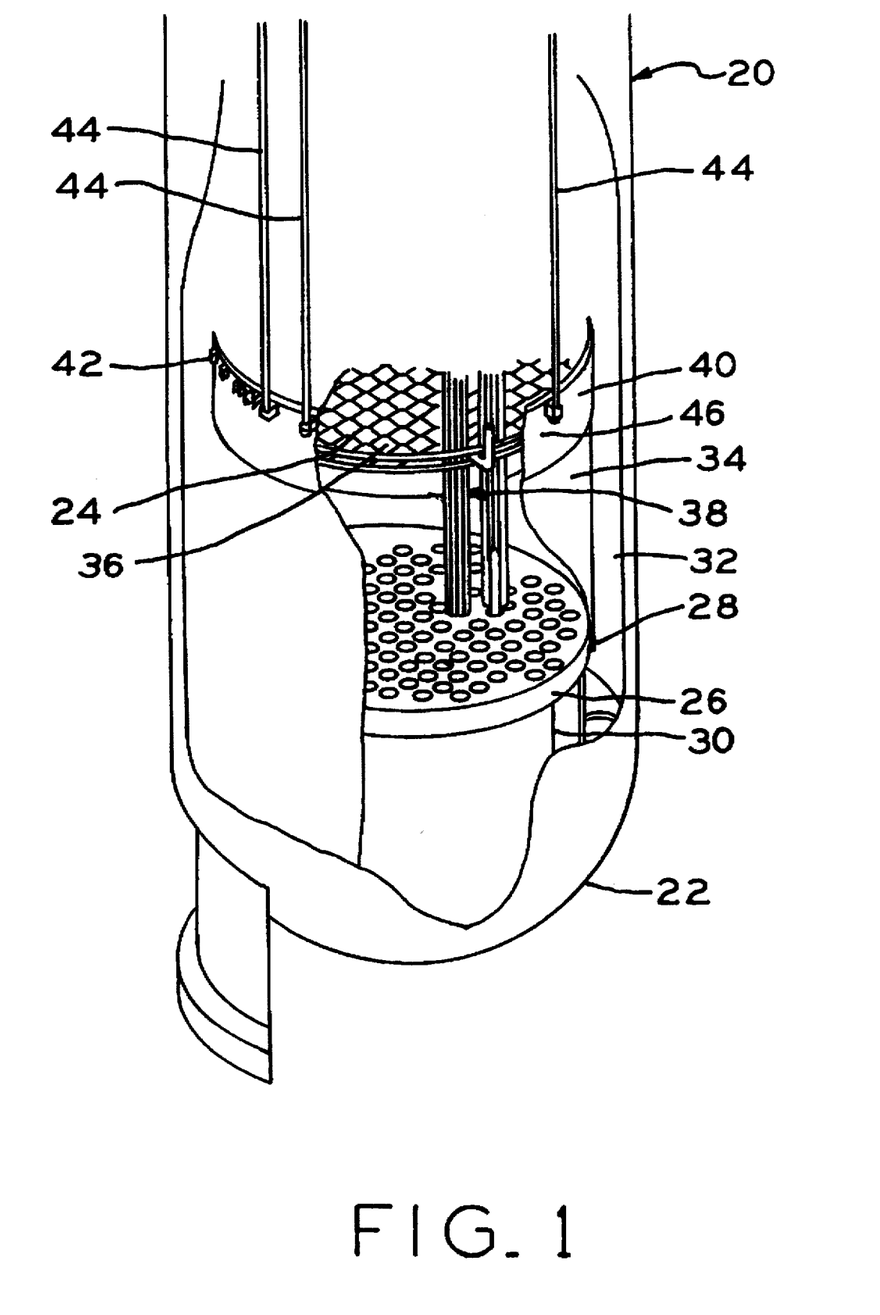
FIG. 1 is a schematic, partial cross-section, illustration of a reactor pressure vessel of a boiling water reactor.

FIG. 1 is a schematic, partial cross section, illustration of a reactor pressure vessel (RPV) 20 for a boiling water reactor. RPV 20 has a generally cylindrical shape and is closed at one end by a bottom head 22 and at its other end by removable top head (not shown). A top guide 24 is spaced above a core plate 26 within RPV 20. A shroud 28 surrounds core plate 26 and is supported by a shroud support structure 30. An annulus 32 is formed between shroud 28 and the wall of RPV 20.

Shroud 28 has a generally cylindrical shape and surrounds the both core plate 26 and top guide 24, and a core 34 is located within shroud 28. Top guide 24 includes several openings 36, and fuel bundles 38 are inserted through openings 36 and supported by core plate 26.

Shroud 28 includes a shroud head 40 having a shroud head flange 42. Guide rods 44 and alignment pins 46 extend through shroud head 40 to align and secure shroud 28 within RPV 20. Shroud head bolts (not shown) are used to further secure and align shroud 28 within RPV 20. RPV 20 is shown in FIG. 1 as being shut down with many components removed. For example, and in operation, steam dryers (not shown) are located in the area above top guide 24.

In accordance with one embodiment of the present invention, the differential expansion between RPV 20 and shroud 28 is utilized to place a compression load, or force, on shroud 28. Particularly, force resulting from the differential expansion is translated by a spring assembly into a compression force on shroud 28.

It should be understood that the present invention is not limited to practice in the boiling water reactor illustrated in FIG. 1, and the present invention could be used in many different reactors having many different alternative configurations. The boiling water reactor of FIG. 1 is illustrated by way of example only and not by way of limitation.

Figure 2:
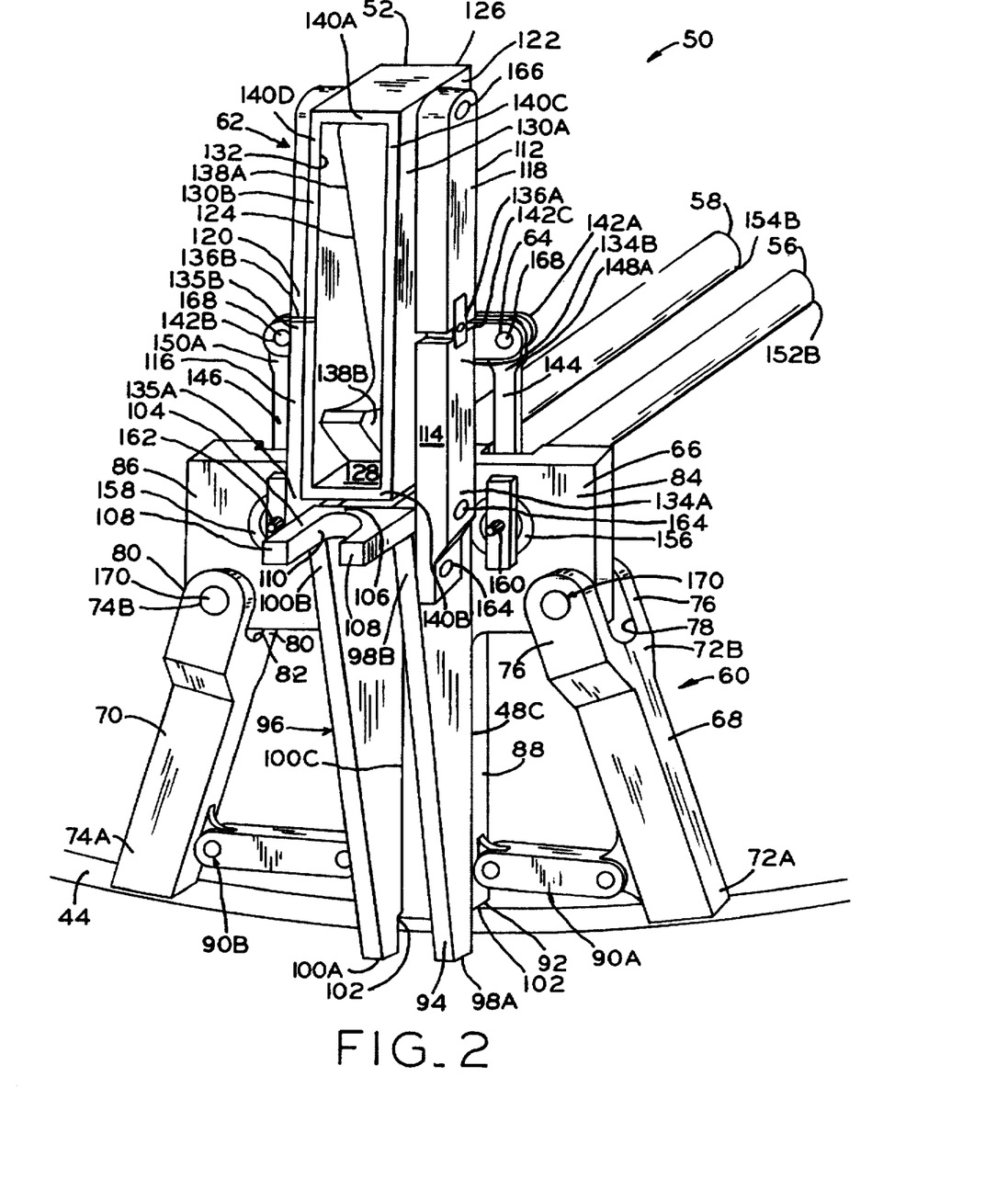
FIG. 2 is a partial illustration of a spring assembly in accordance with one embodiment of the present invention.

FIG. 2 illustrates a spring assembly 50 in accordance with one embodiment of the present invention. Spring assembly 50 includes a first torsion bar support 52, a second torsion bar support 54 (not shown in FIG. 2), a first torsion bar 56 and a second torsion bar 58. First and second torsion bar supports 52 and 54 may, for example, be trusses, and are sometimes referred to herein as trusses.

Truss 52 includes a truss support member 60, a hooking element 62, and a torsion converter element 64. Truss support member 60 includes a truss plate 66 and two legs 68 and 70. Truss legs 68 and 70 include respective first ends 72A and 74A and respective second ends 72B and 74B. First ends 72A and 74A of legs 68 and 70 are configured to rest on shroud head flange 42. Second ends 72B and 74B of legs 68 and 70 are coupled to truss plate 66. Particularly, second end 72B of leg 68 includes substantially parallel spaced arms 76 defining a plate receiving cavity 78 there between. Similarly, second end 74B of leg 70 includes substantially parallel spaced arms 80 having a plate receiving cavity 82 therebetween. Tress plate 66 includes leg portions 84 and 86 configured to be positioned in plate receiving cavities 78 and 82, respectively, and welded or riveted to arms 76 and 78, respectively.

Tress plate 66 further includes a support portion 88 which extends generally transversely from plate leg portions 84 and 86. Support portion 88 also is coupled to both legs 68 and 70. Particularly, a first batten link 90A couples support portion 88 to leg 68, and a second batten link 90B couples support portion 88 to leg 70. Tress plate 66 and legs 68 and 70 are coupled so that a bottom end 92 of support portion 88 rests on shroud head flange 42 when first ends 72A and 74A of legs 68 and 70 abut, or rest on, shroud head flange 42. Of course, bottom end 92 of support portion 88 also may abut, or rest on, shroud head flange 42.

Tress support member 60 further includes two lower vertical links 94 and 96. Lower vertical link 94 includes a bottom end 98A, a top end 98B, and a back surface 98C extending between bottom end 98A and top end 98B. Similarly, lower vertical link 96 includes a bottom end 100A, a top end 100B, and a back surface 100C extending between bottom end 100A and top end 100B. Back surfaces 98C and 100C of lower vertical links 94 and 96, respectively, are secured to truss plate 66 so that links 94 and 96 extend substantially parallel to each other and substantially perpendicular to support portion 88 of truss plate 66. Bottom ends 98A and 100A of lower vertical links 94 and 96, respectively, extend beyond bottom end 92 of support portion 88 so that bottom ends 92 and 98A and bottom ends 92 and 100A, respectively, define shroud head flange cavities 102. Each such cavity 102 is configured to receive at least a portion of shroud head flange 42 therein.

A guide rod tab 104 is coupled to top ends 98B and 100B of lower vertical links 94 and 96. Guide rod tab 104 is substantially "C" shaped and includes a back portion 106 having arms 108 extending from either side thereof. Arms 108 and back 106 define a guide rod channel 110 therebetween, and guide rod channel 110 is configured to receive one of guide rods 44.

Hooking element 62 is pivotally mounted to truss support member 60. Particularly, hooking element 62 includes a column linkage 112 which is coupled to lower vertical links 94 and 96. More specifically, truss support member 60 further includes two attaching links 114 and 116 which are coupled to lower vertical links 94 and 96, respectively, so that attaching links 114 and 116 extend substantially vertically. Hooking element 62 is pivotally coupled to attaching links 114 and 116.

Column linkage 112 includes two spaced and substantially parallel hook links 118 and 120, a hook support box 122 and a hook 124. Hook support box 122 box includes a top end 126, a bottom end 128, and two sidewalls 130A and 130B extending between top end 126 and bottom end 128. Hook support box 122 has a substantially rectangular cross section. Top end 126, bottom end 128 and sidewalls 130A and 130B define a hook cavity 132 within hook support box 122.

Hook links 118 and 120 are fixedly attached to sidewalls 130A and 130B, respectively, so that hook 124 extends between and is connected to hook links 118 and 120, and so that hook links 118 and 120 extend substantially vertically between top end 126 and bottom end 128 of hook support box 122. Attaching links 114 and 116, as described above, are coupled to lower vertical links 94 and 96, respectively. Particularly, a lower end 134A of attaching link 114 is secured to lower vertical link 94, and an upper end 134B of attaching link 114 is pivotally coupled to hook link 118. Similarly, a lower end 135A of attaching link 116 is secured to lower link 96, and an upper end 135B of attaching link 116 is pivotally coupled to hook link 120. Attaching links 114 and 116 are pivotally coupled to hook links 118 and 120 with hinges 136A and 136B, respectively. Accordingly, hook support box 122 is rotatably secured to lower vertical links 94 and 96.

Hook 124 includes a top portion 138A and a bottom portion 138B extending outwardly therefrom. Hook 124 is disposed within hook cavity 132, and top portion 138A of hook 124 is secured to top end 126 of hook 10 support box 122. Bottom portion 138B of hook 124 protrudes from hook support box 122 and is configured to engage guide rod 44. Particularly, top end 126, bottom end 128 and sidewalls 130A and 130B of hook support box 122 each have a front face 140A, 140B, 140C and 140D, respectively. Front faces 140A, 140B, 140C and 140D are substantially flush, and they form a front plane. Similarly, top end 126, bottom end 128 and sidewalls 130A and 130B of hook support box 122 each have a back face (not shown) which are substantially flush, and form a back plane. Hook 124 is positioned so that top portion 138A of hook 124 is between the back plane and the front plane, and bottom portion 138B of hook 124 extends through the front plane. Hook 124 is maintained in such position, for example, with an overcenter latch (not shown in FIG. 2)

Torsion converter element 64 of spring assembly 50 includes a first end 142A, a second end 142B, and an intermediate portion 142C extending between ends 142A and 142B. First end 142A of torsion converter element 64 is secured to first torsion bar 56. Second end 142B of torsion converter element 64 is secured to second torsion bar 58. Intermediate portion 142C of torsion converter element 64 is coupled to hooking element 62 so that rotation of hooking element 62 drives torsion converter element 64 in a substantially vertical direction. Particularly, intermediate portion 142C of torsion converter element is coupled to hooking element 62, and is vertically movable relative to attaching links 114 and 116.

Torsion converter element 64 further includes two torsion links 144 and 146. Torsion link 144 includes a top end 148A and a bottom end 148B (only top end 148A is shown in FIG. 2). Similarly, torsion link 146 includes a top end 150A and a bottom end 150B (only top end 150A is shown in FIG. 2). Top end 148A of torsion link 144 is attached to first end 142A of torsion converter element 64, and bottom end 148B of torsion link 144 is attached to first torsion bar 56. Specifically, bottom end 148B of torsion link 144 is attached to a splined sleeve (not shown in FIG. 2) which is connected to first torsion bar 56. Similarly, top end 150A of torsion link 146 is attached to second end 142B of torsion converter element 64, and bottom end 150B of torsion link 146 is attached to second torsion bar 58. Specifically, bottom end 150B of .torsion link 146 is attached to a splined sleeve (not shown in FIG. 2) which is connected to second torsion bar 58.

First and second torsion bars 56 and 58 are rotatably secured to truss 52. Particularly, first torsion bar 56 includes a first end 152A and a second end 152B (only second end 152B is shown in FIG. 2). Similarly, second torsion bar 58 includes a first end 154A and a second end 154B (only second end 154B is shown in FIG. 2). First end 152A of first torsion bar 56 and first end 154A of second torsion bar 58 are both coupled to truss plate 66. Particularly, truss plate 66 includes first and second torsion bar openings (not shown in FIG. 2) adjacent first and second lower vertical links 94 and 96, respectively. The torsion bar openings are positioned so that lower vertical links 94 and 96 are between the torsion bar openings. First and second bearings 156 and 158, respectively, are positioned in the respective torsion bar openings, and are configured to receive respective first ends 152A and 154A of torsion bars 56 and 58 therein. A first retainer 160 is secured to first bearing 156 and first end 152A of first torsion bar 56 so that first torsion bar 56 is rotatably secured to truss plate 66. Similarly, a second retainer 162 is secured to second bearing 158 and first end 154A of torsion bar 58 so that torsion bar 58 is rotatably secured to truss plate 66.

Top ends 98B and 100B of lower vertical links 94 and 96 are attached to attaching links 114 and 116 with welds 164. Hook links 118 and 120 are attached to hook support box 122 and hook 124 with a hook pin 166. In addition, torsion links 144 and 146 are attached to torsion converter element 64 with pinned clevis 168. Furthermore, truss plate 66 is coupled to first and second legs 68 and 70 with pinned clevis 170.

Figure 3A:
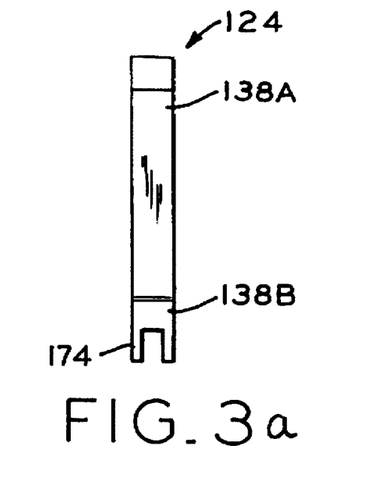
FIG. 3a is a rear view schematic illustration of the hook shown in FIG. 2.
Figure 3B:
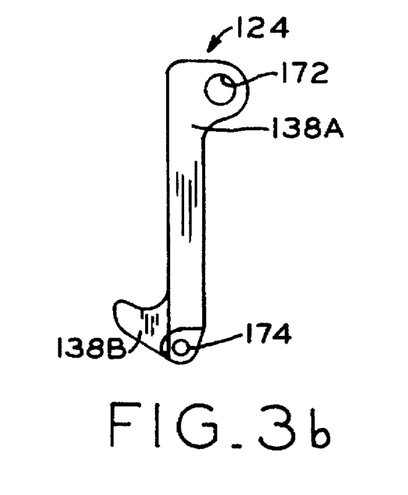
FIG. 3b is a side view schematic illustration of the hook shown in FIG. 2.

FIGS. 3a and 3b are rear view and side view schematic illustrations, respectively, of hook 124. Top portion 138A of hook 124 includes an opening 172 through which hook pin 166 (FIG. 2) extends. An overcenter latch 174 is coupled to hook 124 at lower portion 138B to engage hook 124 in a desired orientation, e.g., to engage hook 124 so that bottom portion 138B at least partially extends through the front plane of hook support box 122 (FIG. 2).

Figure 4A:
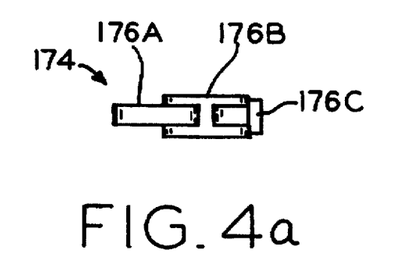
FIG. 4a is a top view schematic illustration of the overcenter latch shown in FIGS. 3a and 3b.
Figure 4B:
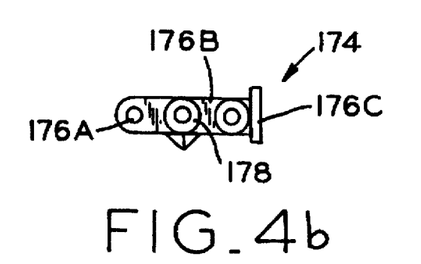
FIG. 4b is a side view schematic illustration of the overcenter latch shown in FIGS. 3a and 3b.

FIGS. 4a and 4b are top view and side view schematic illustrations, respectively, of overcenter latch 174. Overcenter latch 174 includes a first member 176A, a second member 176B, and a third member 176C. Second member 176B is configured to connect first member 176A and third member 176C so that second member 176B is between first and third members 176A and 176C respectively. A center pin 178 is coupled to the connection between first member 176A and second member 176B, and is utilized to engage hook 124 in a desired position. For example center pin 178 may be moved downward to "unlock" the hook and moved upward to "lock" the hook.

Figure 5:
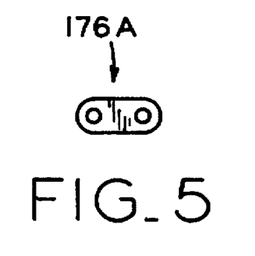
FIG. 5 is a schematic illustration of one member of the overcenter latch shown in FIGS. 4a and 4b.
Figure 6:
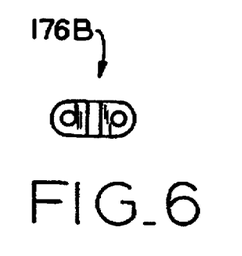
FIG. 6 is a schematic illustration of another member of the overcenter latch shown in FIGS. 4a and 4b.
Figure 7:
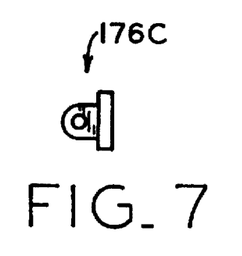
FIG. 7 is a schematic illustration of yet another member of the overcenter latch shown in FIGS. 4a and 4b.

FIG. 5 is a schematic illustration of first member 176A of overcenter latch 174. FIG. 6 is a schematic illustration of second member 176B of overcenter latch 174. FIG. 7 is a schematic illustration a side view of third member 176C of overcenter latch 174.

Second truss 54 (not shown) is configured similarly to truss 52. Particularly, and as described above, truss 54 includes a second truss support member, a second hooking element pivotally mounted to the second truss support member, and a second torsion converter element coupled to the second hooking element. Second truss 54 also includes a guide rod channel adjacent the hooking element configured to receive one of guide rods 44. Second ends 152B and 154B of torsion bars 56 and 58, respectively, are rotatably secured to second truss 54 so that torsion bars 56 and 58 are substantially parallel and extend substantially perpendicular to the sidewall of RPV 102. The second torsion converter element has first and second ends which are splined to second ends 152B and 154B of torsion bars 56 and 58, respectively. Particularly, the second torsion converter element is splined to torsion bars 56 and 58 so that trusses 52 and 54, respectively, apply an opposite torque to torsion bars 56 and 58.

In operation, spring assembly 50 is coupled to shroud 28. Particularly, trusses 52 and 54 are coupled to, e.g., positioned on, shroud head flange 42 so that trusses 52 and 54 extend generally vertically therefrom, and so that respective guide rod channels 110 receive guide rods 44 therein. Hooking elements 62 are positioned so that bottom portions 138B of hooks 124 are engaged with respective guide rods 44. Moreover, trusses 52 and 54 are positioned 180° apart on shroud head flange 42 so that torsion bars 56 and 58 extend across the diameter of shroud 28.

If shroud 28 expands due to thermal conditions, both trusses 52 and 54 will vertically move relative to guide rods 44. Bottom portions 138B of hooks 124 engage guide rods 44, and rotate hooking elements 62 about hinges 136A and 136B. Rotational movement of hooking elements 62 causes torsion converter elements 64, and thus torsion links 144 and 146, to move vertically and rotate torsion bars 56 and 58. Torsion converter elements 64 of each truss 52 and 54 apply equal and opposite torque to torsion bars 56 and 58. Accordingly, trusses 52 and 54 and torsion bars 56 and 58 store strain energy from expanding shroud 28, and generate, e.g., apply, a compression force on shroud 28 to substantially maintain shroud compression.

It is evident from the above discussion that spring assembly 50 substantially maintains shroud compression. In addition, spring assembly 50 is relatively easy to attach to the shroud head, and does not require machining.

Figure 8:
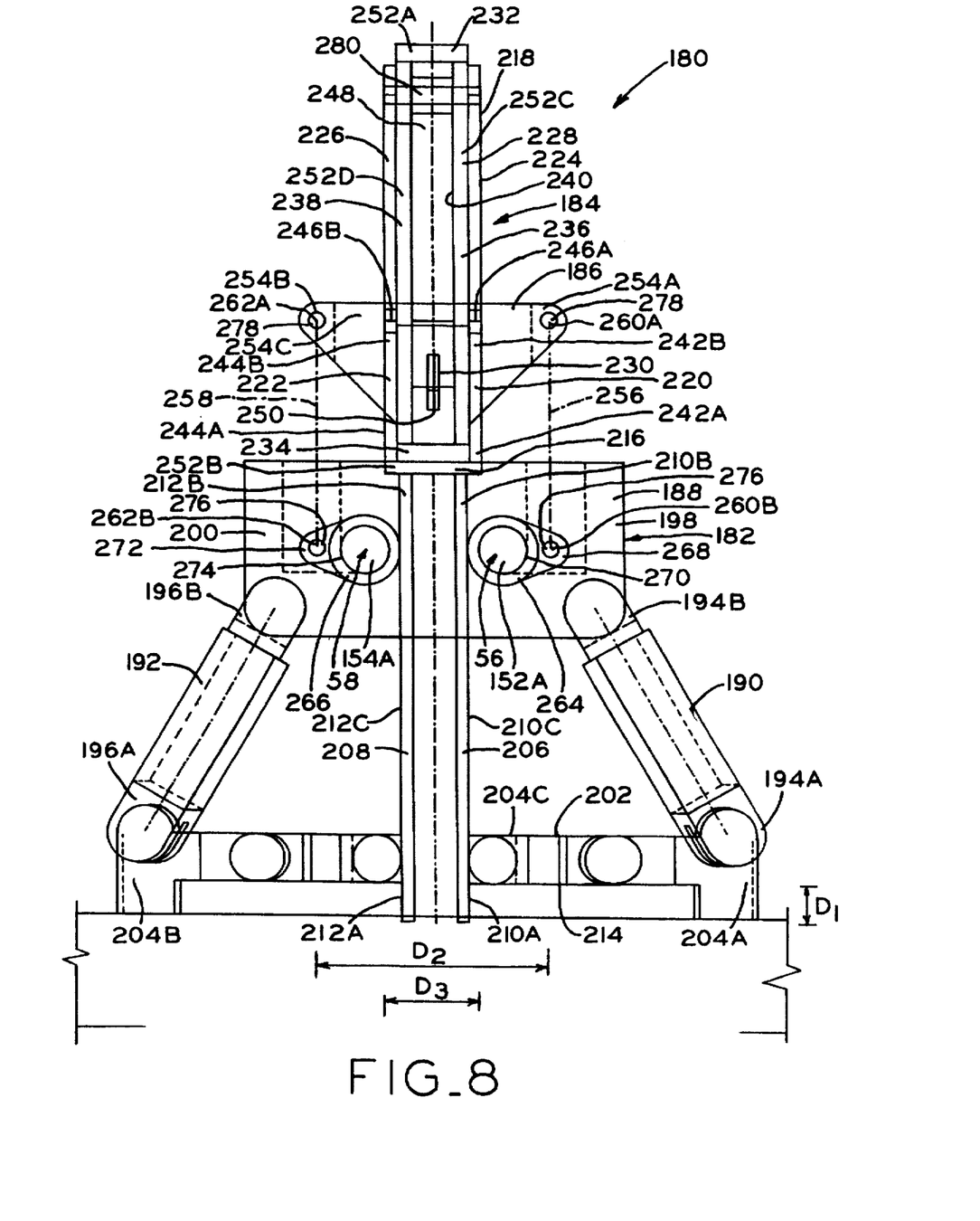
FIG. 8 is a schematic illustration of a truss in accordance with another embodiment of the present invention.

FIG. 8 is a schematic illustration of a truss 180 in accordance with another embodiment of the present invention. Truss 180 includes a truss support member 182, a hooking element 184, and a torsion converter element 186. Truss support member 182 includes a truss plate 188 and two legs 190 and 192. Truss legs 190 and 192 include respective first ends 194A and 196A and respective second ends 194B and 196B. Second ends 194B and 196B of legs 190 and 192 are coupled to truss plate 188. Particularly, truss plate 188 includes leg portions 198 and 200 which are welded or riveted to legs 190 and 192, respectively.

Truss support member 182 also includes an elongate support bar 202 having a first end 204A, a second end 204B and an intermediate portion 204C. First end 194A of leg 190 is coupled to first end 204A of elongate support bar 202. Similarly, first end of 196A of leg 192 is coupled to second end 204B of elongate support bar 202. First and second ends 204A and 204B, respectively, of elongate support bar 202 also are configured to abut, or rest on, shroud head flange 42.

Truss support member 182 further includes two lower vertical links 206 and 208. Lower vertical link 206 includes a bottom end 210A, a top end 210B, and a back surface 210C extending between bottom end 210A and top end 210B. Similarly, lower vertical link 208 includes a bottom end 212A, a top end 212B, and a back surface 212C extending between bottom end 212A and top end 212B. At least a portion of back surfaces 210C and 212C of lower vertical links 206 and 208, respectively, are secured to truss plate 188 so that links 206 and 208 extend substantially parallel to each other. Bottom ends 210A and 212A of lower vertical links 206 and 208, respectively, are secured to elongate support bar 202 and extend beyond a bottom end 214 of elongate support bar 202 at a distance $D_1$.

A guide rod tab 216 is coupled to top ends 210B and 212B of lower vertical links 206 and 208. Guide rod tab 216, as explained with respect to guide rod tab 110 shown in FIG. 2, is substantially "C" shaped having a cavity configured to receive one of guide rods 44.

Hooking element 184 is pivotally mounted to truss support member 182. Particularly, hooking element 184 includes a column linkage 218 which is coupled to lower vertical links 206 and 208. More specifically, truss support member 182 further includes two attaching links 220 and 222 which are coupled to lower vertical links 206 and 208, respectively, so that attaching links 220 and 222 extend substantially vertically. Hooking element 184 is pivotally coupled to attaching links 220 and 222.

Column linkage 218 includes two hook links 224 and 226, a hook support box 228 and a hook 230. Hook support box 228 box includes a top end 232, a bottom end 234, and two sidewalls 236 and 238 extending between top end 232 and bottom end 234. Hook support box 228 has a substantially rectangular cross section. Top end 232, bottom end 234 and sidewalls 236 and 238 define a hook cavity 240 within hook support box 228.

Hook links 224 and 226 are fixedly attached to sidewalls 236 and 238, respectively, so that hook links 224 and 226 extend substantially vertically between top end 232 and bottom end 234 of hook support box 228. Attaching links 220 and 222, as described above, are coupled to lower vertical links 206 and 208, respectively. Particularly, a lower end 242A of attaching link 220 is secured to guide rod tab 216, and an upper end 242B of attaching link 220 is pivotally coupled to hook link 224. Similarly, a lower end 244A of attaching link 222 is secured to guide rod tab 216, and an upper end 244B of attaching link 222 is pivotally coupled to hook link 226. Attaching links 220 and 222 are pivotally coupled to hook links 224 and 226 with hinges 246A and 246B, respectively. Accordingly, hook support box 228 is rotatably secured to truss support member 182.

Hook 230 includes a top portion 248 and a bottom portion 250 extending outwardly therefrom. Hook 230 is disposed within hook cavity 240, and top portion 248 of hook 230 is secured to top end 232 of hook support box 228. Bottom portion 250 of hook 230 protrudes from hook support box 228 and is configured to engage one of guide rods 44. Particularly, top end 232, bottom end 234 and sidewalls 236 and 238 of hook support box 228 each have a front face 252A, 252B, 252C and 252D, respectively. Front faces 252A, 252B, 252C and 252D are substantially flush, and they form a front plane. Similarly, top end 232, bottom end 234 and sidewalls 236 and 238 of hook support box 228 each have a back face (not shown) which are substantially flush, and form a back plane. Hook 230 is positioned so that top portion 248 of hook 230 is between the back plane and the front plane, and bottom portion 250 of hook 230 extends through the front plane.

Torsion converter element 186 of truss 180 includes a first end 254A, a second end 254B, and an intermediate portion 254C extending between ends 254A and 254B. First end 254A of torsion converter element 186 is secured to first torsion bar 56. Second end 254B of torsion converter element 186 is secured to second torsion bar 58. Intermediate portion 254C of torsion converter element 186 is coupled to hooking element 184 so that rotation of hooking element 184 drives torsion converter element 186 in a substantially vertical direction. Particularly, intermediate portion 254C of torsion converter element is coupled to hook links 224 and 226, and is vertically movable relative to attaching links 220 and 222. As shown in FIG. 8, torsion converter element 186 is substantially triangular.

Torsion converter element 186 further includes two torsion links 256 and 258. Torsion link 256 includes a top end 260A and a bottom end 260B. Similarly, torsion link 258 includes a top end 262A and a bottom end 262B. Top end 260A of torsion link 256 is attached to first end 254A of torsion converter element 186, and bottom end 260B of torsion link 256 is attached to first torsion bar 56. Specifically, bottom end 260B of torsion link 256 is splined to first torsion bar 56. Similarly, top end 262A of torsion link 258 is attached to second end 254B of torsion converter element 186, and bottom end 262B of torsion link 258 is attached to second torsion bar 58. Specifically, bottom end 262B of torsion link 258 is splined to second torsion bar 56.

As described above, first and second torsion bars 56 and 58 are rotatably secured to truss 180. Particularly, first end 152A of first torsion bar 56 and first end 154A of second torsion bar 58 are both coupled to truss plate 188. Particularly, truss plate 188 includes first and second torsion bar openings (not shown in FIG. 8) adjacent first and second lower vertical links 206 and 208, respectively. The torsion bar openings are positioned so that lower vertical links 206 and 208 are between the torsion bar openings. First and second bearings 264 and 266, respectively, are positioned in the respective torsion bar openings, and are configured to receive respective first ends 152A and 154A of torsion bars 56 and 58 therein. A first retainer (not shown in FIG. 8) is secured to first bearing 264 and first end 152A of first torsion bar 56 so that first torsion bar 56 is rotatably secured to truss plate 188. Similarly, a second retainer (not shown in FIG. 8) is secured to second bearing 266 and first end 154A of torsion bar 58 so that torsion bar 58 is rotatably secured to truss plate 188.

Torsion bar 56, as shown in FIG. 8, includes a spline 268 at an outer portion 270. Similarly, torsion bar 58 includes a spline 272 at an outer portion 274. Bottom ends 260B and 262B of torsion links 256 and 258, as explained above, are attached to splines 268 and 272, respectively.

Top ends 260A and 262A of torsion links 256 and 258, respectively, are attached to torsion converter element 186 at a distance $D_2$ apart. Torsion bars 56 and 58, however, are spaced a distance $D_3$ apart. Accordingly, when torsion converter element 186 elevates, torsion converter element 186 drives torsion bar 56 in a counter-clockwise direction and drives torsion bar 58 in a clockwise direction.

Bottom ends 260B and 262B of torsion links 256 and 258 are attached to splines 268 and 272, respectively, with welds 276. Similarly, top ends 260A and 262A of torsion links 256 and 258 are attached to torsion converter element 186 with pinned clevis 278. Hook links 224 and 226 are attached to hook support box 228 and hook 230 with an engagement element 280, such as a pin or screw.

Figure 9:
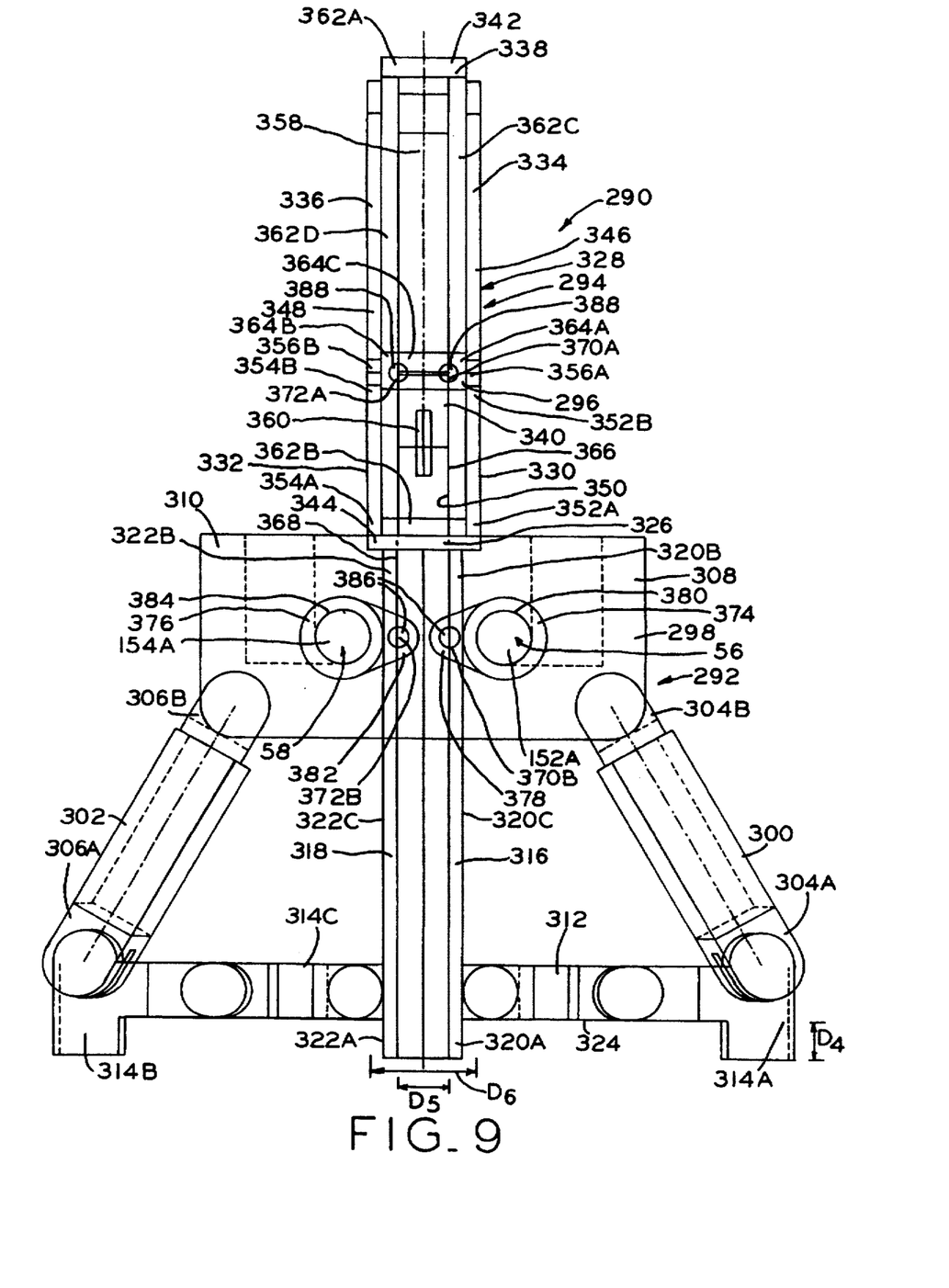
FIG. 9 is a schematic illustration of a truss in accordance with yet another embodiment of the present invention.

FIG. 9 is a schematic illustration of a truss 290 in accordance with yet another embodiment of the present invention. Truss 290 includes a truss support member 292, a hooking element 294, and a torsion converter element 296. Truss support member 292 includes a truss plate 298 and two legs 300 and 302. Truss legs 300 and 302 include respective first ends 304A and 306A and respective second ends 304B and 306B. Second ends 304B and 306B of legs 300 and 302 are coupled to truss plate 298. Particularly, truss plate 298 includes leg portions 308 and 310 which are welded to legs 300 and 302, respectively.

Truss support member 292 also includes an elongate support bar 312 having a first end 314A, a second end 314B and an intermediate portion 314C. First end 304A of leg 300 is coupled to first end 314A of elongate support bar 312. Similarly, first end of 306A of leg 302 is coupled to second end 314B of elongate support bar 312. First and second ends 314A and 314B, respectively, of elongate support bar 312 also are configured to abut, or rest on, shroud head flange 42.

Truss support member 292 further includes two lower vertical links 316 and 318. Lower vertical link 316 includes a bottom end 320A, a top end 320B, and a back surface 320C extending between bottom end 320A and top end 320B. Similarly, lower vertical link 318 includes a bottom end 322A, a top end 322B, and a back surface 322C extending between bottom end 322A and top end 322B. At least a portion of back surfaces 320C and 322C of lower vertical links 316 and 318, respectively, are secured to truss plate 298 so that links 316 and 318 extend substantially parallel to each other. Bottom ends 320A and 322A of lower vertical links 316 and 318, respectively, are secured to elongate support bar 312 and extend beyond a bottom end 324 of elongate support bar 312 at a distance $D_4$.

A guide rod tab 326 is coupled to top ends 320B and 322B of lower vertical links 316 and 318. Guide rod tab 326, as explained with respect to guide rod tab 110 shown in FIG. 2, is substantially "C" shaped having a cavity configured to receive one of guide rods 44.

Hooking element 294 is pivotally mounted to truss support member 292. Particularly, hooking element 294 includes a column linkage 328 which is coupled to lower vertical links 316 and 318. More specifically, truss support member 292 further includes two attaching links 330 and 332 which are coupled to lower vertical links 316 and 318, respectively, so that attaching links 330 and 332 extend substantially vertically. Hooking element 294 is pivotally coupled to attaching links 330 and 332.

Column linkage 328 includes two hook links 334 and 336, a hook support box 338 and a hook 340. Hook support box 338 box includes a top end 342, a bottom end 344, and two sidewalls 346 and 348 extending between top end 342 and bottom end 344. Hook support box 338 has a substantially rectangular cross section. Top end 342, bottom end 344 and sidewalls 346 and 348 define a hook cavity 350 within hook support box 338.

Hook links 334 and 336 are fixedly attached to sidewalls 346 and 348, respectively, so that hook links 334 and 336 extend substantially vertically between top end 342 and bottom end 344 of hook support box 338. Attaching links 330 and 332, as described above, are coupled to lower vertical links 316 and 318, respectively. Particularly, a lower end 352A of attaching link 330 is secured to guide rod tab 326, and an upper end 352B of attaching link 330 is pivotally coupled to hook link 334. Similarly, a lower end 354A of attaching link 332 is secured to guide rod tab 326, and an upper end 354B of attaching link 332 is pivotally coupled to hook link 336. Attaching links 330 and 332 are pivotally coupled to hook links 334 and 336 with hinges 356A and 356B, respectively. Accordingly, hook support box 338 is rotatably secured to truss support member 292.

Hook 340 includes a top portion 358 and a bottom portion 360 extending outwardly therefrom. Hook 340 is disposed within hook cavity 350, and top portion 358 of hook 340 is secured to top end 342 of hook support box 338. Bottom portion 360 of hook 340 protrudes from hook support box 338 and is configured to engage guide rod 44. Particularly, top end 342, bottom end 344 and sidewalls 346 and 348 of hook support box 338 each have a front face 362A, 362B, 362C and 362D, respectively. Front faces 362A, 362B, 362C and 362D are substantially flush, and they form a front plane. Similarly, top end 342, bottom end 344 and sidewalls 346 and 348 of hook support box 338 each have a back face (not shown) which are substantially flush, and form a back plane. Hook 340 is positioned so that top portion 358 of hook 340 is between the back plane and the from plane, and bottom portion 360 of hook 340 extends through the from plane.

Torsion converter element 296 of truss 290 includes a first end 364A, a second end 364B, and an intermediate portion 364C extending between ends 364A and 364B. First end 364A of torsion converter element 296 is secured to first torsion bar 56. Second end 364B of torsion converter element 296 is secured to second torsion bar 58. Intermediate portion 364C of torsion converter element 296 is coupled to hooking element 294 so that rotation of hooking element 294 drives torsion converter element 296 in a substantially vertical direction. Particularly, intermediate portion 364C of torsion converter element is coupled to hook links 334 and 336, and is vertically movable relative to attaching links 330 and 332. As shown in FIG. 9, torsion converter element 296 is substantially rectangular.

Torsion converter element 296 further includes two torsion links 366 and 368. Torsion link 366 includes a top end 370A and a bottom end 370B. Similarly, torsion link 368 includes a top end 372A and a bottom end 372B. Top end 370A of torsion link 366 is attached to first end 364A of torsion converter element 296, and bottom end 370B of torsion link 366 is attached to first torsion bar 56. Specifically, bottom end 370B of torsion link 366 is splined to first torsion bar 56. Similarly, top end 372A of torsion link 368 is attached to second end 364B of torsion converter element 296, and bottom end 372B of torsion link 368 is attached to second torsion bar 58. Specifically, bottom end 372B of torsion link 368 is splined to second torsion bar 56.

As described above, first and second torsion bars 56 and 58 are rotatably secured to truss 290. Particularly, first end 152A of first torsion bar 56 and first end 154A of second torsion bar 58 are both coupled to truss plate 298. Particularly, truss plate 298 includes first and second torsion bar openings (not shown in FIG. 9) adjacent first and second lower vertical links 316 and 318, respectively. The torsion bar openings are positioned so that lower vertical links 316 and 318 are between the torsion bar openings. First and second bearings 374 and 376, respectively, are positioned in the respective torsion bar openings, and are configured to receive respective first ends 152A and 154A of torsion bars 56 and 58 therein. A first retainer (not shown in FIG. 9) is secured to first bearing 374 and first end 152A of first torsion bar 56 so that first torsion bar 56 is rotatably secured to truss plate 298. Similarly, a second retainer (not shown in FIG. 9) is secured to second bearing 376 and first end 154A of torsion bar 58 so that torsion bar 58 is rotatably secured to truss plate 298.

Torsion bar 56, as shown in FIG. 4, includes a spline 378 at an inner portion 380. Similarly, torsion bar 58 includes a spline 382 at an inner portion 384. Bottom ends 370B and 372B of torsion links 366 and 368 of torsion links 366 and 368, as explained above, are attached to splines 378 and 382, respectively.

Top ends 370A and 372A of torsion links 366 and 368, respectively, are attached to torsion converter element 296 at a distance $D_5$ apart. Torsion bars 56 and 58, however, are spaced a distance $D_6$ apart. Accordingly, when torsion converter element 296 elevates, torsion converter element 296 drives first torsion bar 56 in a clockwise direction and drives second torsion bar 58 in a counter-clockwise direction.

Bottom ends 370B and 372B of torsion links 366 and 368 are attached to splines 378 and 382, respectively, with pinned clevis 386. Similarly, top ends 370A and 372A of torsion links 366 and 368 are attached to torsion converter element 296 with welds 388.

Figure 10:
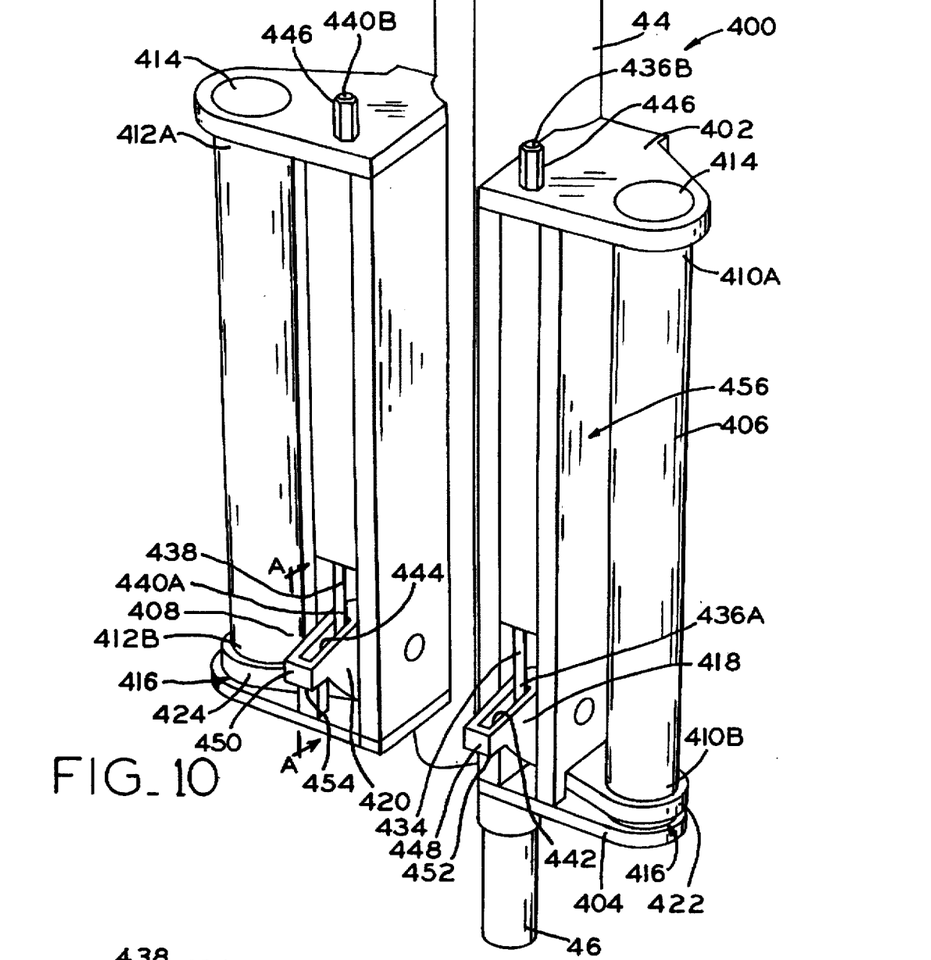
FIG. 10 is a schematic of a spring assembly in accordance with still another embodiment of the present invention.

FIG. 10 is a schematic of a spring assembly 400 in accordance with another embodiment of the present invention. Spring assembly 400 includes a first, or upper, torsion bar support member 402, a second, or lower, torsion bar support member 404, a first torsion bar 406 and a second torsion bar 408. Upper and lower torsion bar support members 402 and 404 are attached to guide rod 44. As shown, guide rod 44 includes an alignment pin 46.

First torsion bar 406 has a first end 410A attached to upper torsion bar support member 402, and a second end 410B attached to lower torsion bar support member 404 so that first torsion bar 406 extends substantially parallel to guide rod 44. Similarly, second torsion bar 408 includes a first end 412A attached to upper torsion bar support member 402, and a second end 412B attached to lower torsion bar support member 404 so that second torsion bar 408 extends substantially parallel to guide rod 44. Particularly, first ends 410A and 412A of torsion bars 406 and 408, respectively, are fixedly attached to upper torsion bar support member 402 with spline fittings 414. Second ends 410B and 412B of torsion bars 406 and 408, however, are rotatably attached to lower torsion bar support member 404. More specifically, lower torsion bar support member 404 includes torsion bar bearings 416 for rotatably securing second ends 410B and 412B of torsion bars 406 and 408 to lower torsion bar support member 404.

Spring assembly 400 further includes a first rotating cam 418 and a second rotating cam 420. First rotating cam 418 is coupled to first torsion bar 406 and second rotating cam 420 is coupled to second torsion bar 408. Each rotating cam 418 and 420, moreover, are configured to rotate respective torsion bars 406 and 408. More specifically, a first torsion bar link 422 couples first rotating cam 418 to second end 410B of first torsion bar 406, and a second torsion bar link 424 couples second rotating cam 420 to second end 412B of second torsion bar 408.

First torsion bar link 422 has a first cam pin opening 426 therein (not shown in FIG. 10). Similarly, second torsion bar link 424 has a second cam pin opening 428 therein (not shown in FIG. 10). A first cam pin 430 (not shown in FIG. 10) extends at least partially through first cam pin opening 426 and a second cam pin 432 extends at least partially through second cam pin opening 428. Cam pins 430 and 432 are configured to engage first and second torsion bar links 422 and 424, respectively, and thus rotate second ends 410B and 412B of torsion bars 406 and 408.

A first latch link element 434 has a lower end 436A and an upper end 436B. A second latch link element 438 also includes a lower end 440A and an upper end 440B. Lower ends 436A and 440A of latch link elements 434 and 438, respectively, are coupled to first and second cam pins 430 and 432. Upper ends 436B and 440B of latch link elements 434 and 438, respectively, extend substantially vertically from fast and second rotating cams 418 and 420 through respective latch link openings 442 and 444. Latch link elements 434 and 438 may, for example, be screws. Bolts 446 or other retainers are coupled to upper ends 436B and 440B of latch link elements 434 and 438, respectively, to secure upper ends 436B and 440B to upper torsion bar support member 402.

First and second rotating cams 418 and 420, as shown in FIG. 5, include cam lips 448 and 450, respectively. Each cam lip 448 and 450 includes a shroud surface 452 and 454, respectively, which is configured to engage shroud head flange 42.

Spring assembly 400 further includes a torsion box 456. Torsion box 456 is substantially parallel to guide rod 44 and extends between upper torsion bar support member 402 and lower torsion bar support member 404. In addition, torsion box 456 is secured to guide rod 44.

Figure 11:
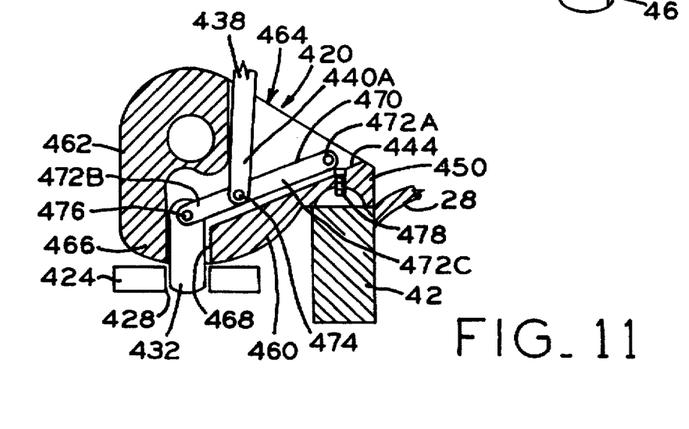
FIG. 11 is a cross-section view of the cam along the view A—A of FIG. 10.

FIG. 11 is a cross-section view of second rotating cam 420 along the view A—A of FIG. 10. Second rotating cam 420 includes a front cam portion 460 and a rear cam portion 462, an upper cam portion 464 includes latch link opening 444 therein, through which latch link element 438 extends. A lower cam portion 466, includes a lower pin opening 468 between front cam portion 460 and rear cam portion 462. Lower pin opening 468 is substantially aligned with second cam pin opening 428 and is sized to receive second cam pin 432 therein. Front cam portion 460 includes lip 450 which is configured to engage shroud head flange 42.

Second rotating cam 420 further includes a linking element 470 for coupling latch link element 438 to second cam pin 432. Particularly, linking element 470 includes a first end 472A, a second end 472B, and an intermediate portion 472C. Second latch link element 438 is secured to intermediate portion 472C with a rotatable pin 474. Similarly, second cam pin 432 is secured to second end 472B with a rotatable pin 476. First end 72A is adjacent lip 450 and configured to be pinned to lip 450. Second cam pin 432 extends through lower pin opening 468 and extends through second torsion bar link 424.

Front cam portion 460, as shown in FIG. 11, includes a cylindrical bearing member 478. Bearing member 478 is threadably coupled to front cam portion 460. First rotating cam 418 is configured identically to second rotating cam 420.

In operation, spring assembly 400 is coupled to shroud 28. Particularly, spring assembly 400 is secured to guide rod 44 so that first and second torsion bars 406 and 408 extend substantially parallel to guide rod 44. In addition, first and second rotating cams 418 and 420 are positioned so that lips 448 and 450 abut, or rest on, shroud head flange 42. First and second cam pins 430 and 432 are positioned, or locked, within first and second cam pin openings 426 and 428, and latch link elements 434 and 438 are secured to first torsion bar support member 402.

When shroud 28 expands due to thermal conditions, first and second rotating cams 418 and 420 will rotate relative to guide rod 44. Accordingly, first and second cam pins 430 and 432 will move, thus driving torsion bar links 422 and 424. Driving torsion bar links 422 and 424 rotate second ends 410B and 412B of torsion bars 406 and 408, respectively. Torque box 456 reacts to rotating, i.e., torquing, torsion bars 406 and 408, and generates, or applies, a compression force on shroud 28 to substantially maintain shroud compression.

It is believed that spring assembly 400 obviates any need for shroud bolts adjacent guide rods 44 in RPV 102. It also is believed that spring assembly 400 obviates any need for machining the shroud head 40.

From the preceding description of the present invention, it is evident that the objects of the invention are attained. Although the invention has been described and illustrated in detail, it is to be clearly understood that the same is intended by way of illustration and example only and is not be taken by way of limitation. Accordingly, the spirit and scope of the invention are to be limited only by the terms of the appended claims.

What is claimed is:

1. A spring assembly for compressing a core shroud of a nuclear reactor, the nuclear reactor including at least one guide rod, the core shroud including a shroud head flange, said spring assembly comprising:

first and second trusses;

a first torsion bar having opposing ends;

a second torsion bar having opposing ends; and one end of each said torsion bar rotatably connected to said first truss, said other end of each said torsion bar rotatably connected to said second truss.

2. A spring assembly in accordance with claim 1 wherein at least one of said trusses comprises:

a truss support member;

a hooking element pivotally mounted to said truss support member; and a torsion converter element coupled to said hooking element and configured to rotate said torsion bars, said torsion converter element having a first end and a second end, said first end coupled to said first torsion bar, and said second end coupled to said second torsion bar.

3. A spring assembly in accordance with claim 2 wherein said torsion converter element further comprises a first torsion link and a second torsion link, each said torsion link having a first end and a second end, said first end of said first torsion link coupled to said first end of said torsion converter element, said second end of said first torsion link coupled to said first torsion bar, said first end of said second torsion link coupled to said second end of said torsion converter element, said second end of said second torsion link coupled to said second torsion bar.

4. A spring assembly in accordance with claim 3 wherein said second end of said first torsion link is splined to said first torsion bar.

5. A spring assembly in accordance with claim 2 wherein said truss support member comprises:

a truss plate comprising a first leg portion and a second leg portion;

a first leg having two ends, one of said first leg ends coupled to said first leg portion; and a second leg having two ends, one of said second leg ends coupled to said second leg portion.

6. A spring assembly in accordance with claim 5 wherein said truss support member further comprises a guide rod tab.

7. A spring assembly in accordance with claim 2 wherein said hooking element comprises a hook and two substantially parallel and spaced hook links, said hook connected to and extending between said hook links, each hook link pivotally coupled to said truss support member.

8. A spring assembly in accordance with claim 2 further comprising a hinge for pivotally mounting said hooking element to said truss support member.

9. A spring assembly in accordance with claim 1 wherein said torsion converter element is substantially triangular.

10. A spring assembly for compressing a core shroud of a nuclear reactor, the nuclear reactor including at least one guide rod, the core shroud including a shroud head flange, said spring assembly comprising:

a first torsion bar having first and second ends;

a second torsion bar having first and second ends;

a first torsion bar support member; and a second torsion bar support member, said first ends of said first and second torsion bars each coupled to said first torsion bar support member, said second ends of said first and second torsion bars each coupled to said second torsion bar support member.

11. A spring assembly in accordance with claim 10 wherein said first ends of said first and second torsion bars are each splined to said first torsion bar support member.

12. A spring assembly in accordance with claim 10 wherein said first torsion bar support member is fixedly attached to the guide rod, and said second torsion bar support member is fixedly attached to the guide rod so that the guide rod extends between said first and second torsion bars.

13. A spring assembly in accordance with claim 10 further comprising a first rotating cam and a second rotating cam, said first rotating cam coupled to said first torsion bar and configured to rotate said first torsion bar, said second rotating cam coupled to said second torsion bar and configured to rotate said second torsion bar.

14. A spring assembly in accordance with claim 13 further comprising a first torsion bar link and a second torsion bar link, said first torsion bar link coupling said first torsion bar to said first rotating cam, said second torsion bar link coupling said second torsion bar to said second rotating cam.

15. A spring assembly in accordance with claim 13 further comprising at least one torque box, said torque box extending between said first torsion bar support member and said second torsion bar support member so that said torque box is substantially parallel to said first torsion bar.

16. A spring assembly in accordance with claim 15 wherein said torque box is secured to the guide rod.

17. A method for applying a compression force on a core shroud of a nuclear reactor using a spring assembly, the spring assembly including a first torsion bar, a second torsion bar, a first torsion bar support member, and a second torsion bar support member, the first torsion bar connected at one end to the first torsion bar support member and at the other end to the second torsion bar support member, the second torsion bar connected at one end to the first torsion bar support member and at the other end to the second torsion bar support member, said method comprising the steps of:

coupling the spring assembly to the core shroud; and rotating the first and second torsion bars.

18. A method in accordance with claim 17 wherein the nuclear reactor includes a guide rod secured to the core shroud, and wherein coupling the spring assembly to the core shroud comprises the step of attaching the first torsion bar support member to the guide rod so that the first torsion bar is substantially parallel to the guide rod.

19. A method in accordance with claim 17 wherein the nuclear reactor includes a guide rod secured to the core shroud, and wherein the first torsion bar support member includes a truss having a truss support member and a hooking element pivotally mounted to the truss support member, the hooking element including a hook, and wherein coupling the spring assembly to the core shroud comprises the step of coupling the truss support member to the core shroud so that the hook engages the guide rod.

* * * * *